Oct. 11, 1949.  R. L. BROWN  2,484,150

WORK-EXPELLING DEVICE FOR TUBULAR SAWS

Filed Dec. 10, 1946

Inventor

ROBERT LEE BROWN

By *Clarence A. O'Brien and Harvey B. Jacobson*
Attorneys

Patented Oct. 11, 1949

2,484,150

UNITED STATES PATENT OFFICE 2,484,150

WORK-EXPELLING DEVICE FOR TUBULAR SAWS

Robert Lee Brown, Chesapeake, W. Va.

Application December 10, 1946, Serial No. 715,276

1 Claim. (Cl. 143—85)

This invention relates to new and useful improvements and structural refinements in tubular saws, that is, saws which are adapted for forming relatively large apertures by removing a disc-like portion from the work, and the principal object of the invention is to provide a device of the character herein described which embodies in its construction means for forcibly expelling such disc-like portion from the surrounding work, as the saw approaches the end of its cut.

A further object of the invention is to provide a tubular saw in which the expelling means and associated structure may be readily used with interchangeable "saw blades" of various diameters.

Another object of the invention is to provide a tubular saw which is simple in construction and which may be easily and conveniently manipulated.

An additional object of the invention is to provide a tubular saw which will not easily become damaged, which will readily lend itself to economical manufacture, and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a side elevation of the invention, showing the same associated with an electric hand drill;

Figure 2 is a cross sectional view of the invention per se, showing the device at the commencement of the cutting operation, and Figure 3 is a cross sectional view, similar to that shown in Figure 2, but showing the device at the conclusion of the cutting operation.

Like characters of reference are used to designate like parts in the specification and throughout the several views.

Referring now to the accompanying drawings in detail, the invention consists of a tubular saw designated generally by the reference character 10, the same embodying in its construction a holder 11 which may be formed integrally with an adaptor shank 12. The latter is removably receivable in a conventional chuck 13 such as usually provided on an electric hand drill 14. It should be understood that the chuck and the hand drill constitute no component parts of the instant invention and are shown for illustrative purposes only.

The holder 11 is also provided with an externally threaded adaptor 15 which is removably receivable in a boss 16 associated with an annular flange 17. The latter, in turn, removably receives one end portion of a cylindrical sleeve 18, which constitutes what may be referred to as the "saw blade." The edge at the remaining end of the sleeve 18 is formed with a plurality of cutting teeth 19, as will be clearly apparent.

The essence of the invention resides in providing the adaptor 15 with an axial bore 20 which extends into the holder 11 and receives a removable stem 21. This stem is removably secured in position by a suitable set screw 22 provided in the holder 11 and it will be noted that one end portion of the stem projects from the adaptor 15 and carries a ball bearing 23.

This bearing, in turn, is secured in one end of a tubular jacket 24, the remaining end of which is closed except for an aperture 25 which accommodates a slidable plunger 26. It will be noted that the jacket 24 extends axially in the sleeve 18 and the inner end of the plunger 26 is formed with an enlarged head 27. A compression spring 28, positioned in the jacket 24, is interposed between the aforementioned bearing 23 and the head 27 of the plunger, as will be clearly apparent.

The free end, that is, the end of the plunger 26 which is disposed adjacent the teeth 19, terminates in a pointed extremity 29, the purpose of which will be hereinafter more fully explained.

Finally, it will be noted that the aforementioned sleeve 18 is removably secured in the flange 17 by means of a clamp screw 30, the latter being receivable in an open slot 31 provided in the flange, as is best shown in Figure 1.

When the invention is placed in use, the complete device is connected to the drill 14 by inserting the shank 12 in the chuck 13, and it will be found that by applying the toothed edge 19 of the sleeve 18 to the work 32, a relatively large aperture 33 may be cut by simply removing a disc-like portion 34 of the work. This operation is, of course, of a conventional nature, but the utility of the invention will be readily appreciated when it is noted that the extremity 29 of the plunger 26 will forcibly expel the portion 34 from the work, when the cutting operation is nearing completion. The work should be preferably center-punched at the "center" of the portion 34 before the cutting operation is begun, and the extremity 29 of the plunger 26 should be engaged with the center punch for purposes of guidance. As the cutting operation continues, the resiliency of the spring 28 will urge the plunger 26 against the work, more specifically, against the portion 34, so that said portion will be forcibly expelled, as aforesaid. It will be observed that in this manner, the invention will eliminate the previously experienced necessity of removing the portion 34 by hand, at the conclusion of the cutting operation.

It should be also noted that by virtue of the anti-friction bearing 23, the plunger 26 will remain stationary while the rotation of the sleeve 18 is in progress.

It is believed that the advantages and use of the invention will be clearly understood from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a tubular saw, the combination of a rotatable saw blade holder formed with an axial bore, a stem removably secured in said bore and projecting outwardly therefrom, and a work cut-out expelling unit comprising a stationary tubular jacket having inturned flanges at the ends thereof, an expelling plunger having an enlarged head slidable in said jacket and engageable with one flange thereof, an anti-friction bearing positioned in said jacket against the remaining flange, and a compression spring positioned in said jacket and bearing against said bearing and said head, said bearing being mounted on the projecting portion of said stem, whereby said expelling unit may be non-rotatably supported by said holder.

ROBERT LEE BROWN.

REFERENCES CITED

The following references are of record in the file of this patent:

UNITED STATES PATENTS

| Number | Name | Date |
| --- | --- | --- |
| 476,312 | Resche | June 7, 1892 |
| 1,365,660 | Collier | Jan. 18, 1921 |
| 1,705,049 | Fournier | Mar. 12, 1929 |
| 1,855,873 | Shortell | Apr. 26, 1932 |

FOREIGN PATENTS

| Number | Country | Date |
| --- | --- | --- |
| 170,193 | Great Britain | Oct. 20, 1921 |
| 203,570 | Great Britain | Sept. 13, 1923 |
| 383,221 | Germany | Oct. 11, 1923 |
| 433,307 | Germany | Aug. 27, 1926 |